United States Patent
Hong

(10) Patent No.: US 10,290,081 B2
(45) Date of Patent: May 14, 2019

(54) SYSTEM FOR IMAGE DEHAZING BY MODIFYING LOWER BOUND OF TRANSMITTANCE AND METHOD THEREFOR

(71) Applicant: INDUSTRY FOUNDATION OF CHONNAM NATIONAL UNIVERSITY, Gwangju (KR)

(72) Inventor: Sung-Hoon Hong, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 32 days.

(21) Appl. No.: 15/394,535

(22) Filed: Dec. 29, 2016

(65) Prior Publication Data

US 2017/0316551 A1 Nov. 2, 2017

(30) Foreign Application Priority Data

Apr. 29, 2016 (KR) .......................... 10-2016-0053355

(51) Int. Cl.
*G06T 5/00* (2006.01)
*G06T 5/20* (2006.01)

(52) U.S. Cl.
CPC ................ *G06T 5/003* (2013.01); *G06T 5/20* (2013.01); *G06T 2207/20172* (2013.01); *G06T 2207/20192* (2013.01)

(58) Field of Classification Search
None
See application file for complete search history.

(56) References Cited

FOREIGN PATENT DOCUMENTS

KR 10-2010-0021952 A 2/2010
KR 10-2014-0140463 A 12/2014

OTHER PUBLICATIONS

Yoav Y. Schechner et al., "Instant Dehazing of Images Using Polarization", Proc. Computer Vision & Pattern Recognition, 2001, pp. 325-332, vol. 1.
Sarit Shwartz et al., "Blind Haze Separation", Proc. IEEE Computer Vision and Pattern Recognition (CVPR), 2006, pp. 1984-1991, vol. II.
Srinivasa G. Narasimhan et al., "Chromatic Framework for Vision in Bad Weather", Proc. CVPR, 2000, pp. 598-605.
Srinivasa G. Narasimhan et al., "Contrast Restoration of Weather Degraded Images", IEEE Transactions on Pattern Analysis and Machine Intelligence, Jun. 2003, pp. 713-724, vol. 25, No. 6.
Shree K. Nayar et al., "Vision in Bad Weather", Proc. ICCV, Sep. 1999, pp. 820-827.

(Continued)

*Primary Examiner* — Mark Roz
(74) *Attorney, Agent, or Firm* — Rabin & Berdo, P.C.

(57) ABSTRACT

Disclosed is a system for image dehazing by modifying a lower bound of a transmission rate and a method therefor, whereby a clear image is obtained by removing components, such as fog or haze, from an image having low image quality due to fog or haze, the system configured such that a lower bound of a transmission rate representing how many rate of haze is mixed is calculated for each pixel, and an initial transmission rate is obtained by an exponentiation operation with the lower bound of transmission rate. By transmission rate correction that reserves an edge showing a large change relative to the initial transmission rate and processes a smooth area showing a small change with a low-pass filter, a final transmission rate is obtained such that a clear image is obtained by removing haze components.

7 Claims, 8 Drawing Sheets

(56) References Cited

OTHER PUBLICATIONS

Johannes Kopf et al., "Deep Photo: Model-Based Photograph Enhancement and Viewing", ACM Trans. Graphics, Dec. 2008, pp. 1-10, vol. 27, No. 5.
Sirinivasa G. Narasimhan et al., "Interactive (De) Weathering of an Image using Physical Models", In Workshop on Color and Photometric Methods in Computer Vision, Oct. 2003.
Robby T. Tan, "Visibility in Bad Weather from a Single Image", Proc CVPR, Jun. 2008, pp. 1-8.
Raanan Fattal, "Single Image Dehazing", ACM Trans. Graphics, Aug. 2008, pp. 1-9, vol. 27, No. 3.
Kaiming He et al., "Single Image Haze Removal Using Dark Channel Prior", Proc. CVPR, Jun. 2009, pp. 1956-1963.
Jean-Philippe Tarel et al., "Fast Visibility Restoration from a Single Color or Gray Level Image", Computer Vision, 2009 IEEE $12^{th}$ International Conference, Sep. 2009, pp. 2201-2208.
Jin-Hwan Kim et al., "Haze Removal Algorithm Using Improved Dark Channel Prior", KST, pp. 202-204.

SYSTEM FOR IMAGE DEHAZING BY MODIFYING LOWER BOUND OF TRANSMITTANCE AND METHOD THEREFOR

CROSS REFERENCE TO RELATED APPLICATION

The present application claims priority to Korean Patent Application No. 10-2016-0053355, filed Apr. 29, 2016, the entire contents of which is incorporated herein for all purposes by this reference.

STATEMENT REGARDING SPONSORED RESEARCH

This research was supported by the MSIP (Ministry of Science, ICT and Future Planning) of Korea, under the ITRC (Information Technology Research Center) support program (IITP-2016-R2718-16-0011) supervised by the IITP (Institute for Information & communications Technology Promotion)

BACKGROUND OF THE INVENTION

Field of the Invention

The present invention relates generally to a system for image dehazing by modifying a lower bound of a transmittance (or, transmittance rate) and a method therefor. More particularly, the present invention relates to a system for image dehazing by modifying a lower bound of a transmittance and a method therefor, in which a clear image is obtained by removing components, such as fog or haze, from an image having low image quality due to fog or haze.

Description of the Related Art

Recently, an image monitoring system or an image black box for automobiles or the like is used for detection or prevention of accidents. Further, in the case of an advanced safety vehicle, study is being conducted to provide a lane deviation or car collision warning system by extracting lanes and nearby vehicle information from the image acquired by a video camera.

In order to improve the performance of a computer vision application system or image process, a clear input image is needed. Particularly, when detecting or estimating an object or using the edge information of the image, a clearer image will bring a better result.

However, in case of an image taken outdoors, the brightness and the color reflected from an object are affected by particles in the air. Thus, its original color and brightness contrast are not provided, especially, in case that there are large particles in the air such as haze and smoke.

As for the conventional method for improving an image that includes fog, etc., there is Korean Patent Publication No. 10-2010-0021952 (hereinafter, 'prior art') in addition to a plurality of applications published and disclosed.

The method according to the prior art comprises a step of receiving the first luminance image of an image including airlight, and producing a map of atmosphere airlight based on the ratio of the standard deviation and the average of the first luminance image; and a step of outputting the second luminance image from which the atmosphere airlight is removed by subtracting a map of atmosphere airlight produced from the first luminance image. However, in the prior art a fogged image process is processed by a block unit, and not by a pixel unit.

On the other hand, a variety of methods for estimating a clear image by removing fog from a fogged image have been proposed. In the early stage, a method using a number of images or additional information besides an image was proposed to restore a fogged image to a fog-eliminated image. As the method using a number of images, the method using polarization [1, 2] was proposed. This method acquires two or more images taken with respectively different polarization filters installed in precisely a same location, and the depth value is calculated by using a method for measuring the polarized amount, and the fog is removed by using it.

These methods provide a very good image; however, there is a limitation that respectively different polarization filters have to be used in the same location. In a method [3, 4, 5], when simply using a number of images without using a polarization filter, fog value and depth information are obtained from two images taken under different weather environments to remove the fog. Kopf, et al. [6] proposed a method for removing fog by using depth information of an image instead of using a number of images, and the fog was removed by obtaining depth or texture information by using GPS information embedded in a camera and assuming concentration (density) of fog value is depth information.

The methods for removing fog by using a number of images or using a single image with additional information have a defect that they cannot be adapted to an image taken by a dynamically-moving camera because they need to secure image data in various conditions. Thus recently, a method for removing fog by using a single image is being studied.

Tan [8] proposed a method for removing fog by increasing brightness contrast. That is, fog was removed by using the characteristic that a clear image without fog had higher edge strength than a fogged image and the fog value did not change rapidly. In this method, the brightness contrast is highly improved, thus the shape and structure of an image are advantageously revealed. However, excessive increase of contrast may cause saturation, and a halo effect may occur in the section where the depth information is largely different. Fattal [9] proposed a method for restoring a fog-eliminated image by measuring the image reflection ratio through assumption that a reflection ratio measured within a constant image area has always the same vector direction.

He et al. [10] used the characteristic that a clear image has a higher chroma of color than a fogged image, and proposed a method that removes fog by the observation result that a pixel with high color sharpness in a clear image without fog has a very low channel value of one of R, G, B values, thus a color image without fog has a pixel with very low channel value in a certain area. However, in case only a luminance image is used because RGB color is used in the conventional method using only a single image, fog-elimination performance is degraded, and when a large size of filter is used, a halo effect occurs and a large calculation amount is required to refine a transmittance. Thus there is difficulty in real time processing.

Tarel et al. [11] proposed a fog elimination method using a median filter in order to improve the calculation speed. However, if using a large size median filter, there is a disadvantage that the calculation speed is decelerated and a halo effect can occur.

[1] Y. Y. Schechner, S. G. Narasimhan, and S. K. Nayar, "Instant dehazing of images using polarization," in Proc. CVPR, pp. 325-332, Hawaii, USA, December 2001.
[2] S. Shwartz, E. Namer, and Y. Y. Schechner, "Blind haze separation," in Proc. CVPR, pp. 1984-1991, New York, USA, October 2006.
[3] S. G. Narasimhan and S. K. Nayar, "Chromatic framework for vision in bad weather," in Proc. CVPR, pp. 598-605, SC, USA, June 2000.
[4] S. G. Narasimhan and S. K. Nayar, "Contrast restoration of weather degraded images," IEEE Trans. Pattern Anal. Mach. Intell., vol. 25, no. 6, pp. 713-724, June 2003.
[5] S. K. Nayar and S. G. Narasimhan, "Vision in bad weather," in Proc. ICCV, pp. 820-827, Corfu, Greece, September 1999.
[6] J. Kopf, B. Neubert, B. Chen, M. Cohen, D. Cohen-Or, O. Deussen, M. Uyttendaele, and D. Lischinski, "Deep photo: Model-based photograph enhancement and viewing," ACM Trans. Graphics, vol. 27, no. 5, pp. 1-10, December 2008.
[7] S. G. Narasimhan and S. K. Nayar, "Interactive deweathering of an image using physical models," In Workshop on Color and Photometric Methods in Computer Vision, October 2003
[8] R. Tan, "Visibility in bad weather from a single image," in Proc CVPR, pp. 1-8, Alaska, USA, June 2008.
[9] R. Fattal, "Single image dehazing," ACM Trans. Graphics, vol. 27, no. 3, pp. 1-9, August 2008.
[10] K. He, J. Sun, and X. Tang, "Single image haze removal using dark channel prior," in Proc. CVPR, pp. 1956-1963, Miami, USA, June 2009.
[11] Tarel, Jean-Philippe; Hautiere, Nicolas; "Fast visibility restoration from a single color or gray level image," Computer Vision, 2009 IEEE 12th International Conference on, pp. 2201-2208, September 2009.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a system for image dehazing by modifying a lower bound of a transmittance and a method therefor, in which real-time processing is enabled in an embedded processor, such as a mobile phone, by an amount of calculation smaller than that of a conventional method.

The present invention is further intended to propose a system for image dehazing by modifying a lower bound of a transmittance and a method therefor, in which a clear image is provided by removing components that lower visibility from an image having lowered visibility due to mixture of light and color components of an object and light and color components, such as haze, fog, clouds, and the like, in the air.

The present invention is further intended to propose a system for image dehazing by modifying a lower bound of a transmittance and a method therefor, in which it is possible to maintain dehazing performance without a halo effect, and an amount of calculation is reduced to enable real-time processing in an embedded processor, such as a mobile phone.

In order to achieve the above object, according to one aspect of the present invention, there is provided a system for image dehazing by modifying a lower bound of a transmittance, the system including: an atmospheric brightness value calculation unit for calculating an atmospheric brightness value $A^c$ corresponding to a distance farthest away from a camera relative to an input signal $I^c(x)$; a transmittance lower bound calculation unit for calculating a lower bound of a transmittance $t_{LB}(x)$ by receiving the input signal and the atmospheric brightness value from the atmospheric brightness value calculation unit; an exponentiation operation unit for operating an initial transmittance $[t_{LB}(x)]^P$ by multiplying the lower bound of transmittance P times; a transmittance correction unit for calculating a final transmittance by correcting the initial transmittance such that an output restored image is dehazed without a halo effect; a restored image calculation unit for calculating a dehazed image through operation; and a postprocessing unit for outputting a final restored image $J^c(x)$ by increasing brightness contrast.

Preferably, the transmittance lower bound calculation unit calculates the lower bound of transmittance $t_{LB}(x)$ by Equation 11.

$$t_{LB}(x) = 1 - \min_{c \in \{R,G,B\}} \left( \frac{I^c(x)}{A^c} \right) \quad \text{[Equation 11]}$$

Further, preferably, the restored image calculation unit calculates the dehazed image by Equation 12.

$$J^c(x) = \frac{I^c(x) - A^c}{\max(t(x), t_0)} + A^c \quad \text{[Equation 12]}$$

Further, preferably, the final transmittance is obtained by applying an edge reserved low-pass filter to the initial transmittance.

Further, preferably, the image dehazing system further includes: an initial transmittance separation unit arranged to separate the initial transmittance into low-frequency components $t_L(x)$ and high-frequency components $t_H(x)$; and a compression coefficient computing unit arranged such that the high-frequency components are low-pass filtered to obtain a compression coefficient value $\omega(x)$ proportional to an absolute value of the initial transmittance having been low-pass filtered as shown in Equation 13, and the final transmittance $t(x)$ is obtained by adding a value $t_h(x)$ obtained by multiplying the compression coefficient value by the high-frequency components and the low-frequency components of the initial transmittance.

$$t_h(x) = w(x) \times t_H(x) \quad \text{[Equation 13]}$$
$$= \min\left(\frac{|F(t_H(x))|}{D}, 1\right) \times t_H(x)$$

Further, preferably, the image dehazing system further includes: an initial transmittance separation unit arranged to separate the initial transmittance into low-frequency components $t_L(x)$ and high-frequency components $t_H(x)$; a threshold value processing unit for expressing a position of a component of the high-frequency components $t_H(x)$ of the initial transmittance greater than a threshold value as 1; an independent component removal unit for converting independently existing 1 output from the threshold value processing unit into 0; an extension processing unit configured to perform an extension processing on a component expressed as 1 output from the independent component removal unit so as to output a value R(x) having a position of an extended area expressed as 1 and a position of a rest expressed as 0; a multiplication operator for obtaining modified high-frequency components $t_h(x)$ by multiplying the value R(x) by the high-frequency components of the initial transmittance; and an addition operator for outputting the final transmittance t(x) by adding the modified high-frequency components $t_h(x)$ of the initial transmittance and the low-frequency components $t_L(x)$.

Preferably, a method for image dehazing by modifying a lower bound of transmittance, wherein the method uses a system for image dehazing by modifying a lower bound of transmittance, the image dehazing system including an atmospheric brightness value calculation unit, a transmittance lower bound calculation unit, an exponentiation operation unit, a transmittance correction unit, a restored image calculation unit, and a postprocessing unit, the method includes: calculating a brightness value relative to an atmospheric brightness value of an input image by using the atmospheric brightness value calculation unit; calculating a lower bound of transmittance for each pixel using information on the input image and the atmospheric brightness value by using the transmittance lower bound calculation unit; obtaining an initial transmittance by an exponentiation operation with the lower bound of transmittance by using the exponentiation operation unit; correcting the input image to have a strong edge relative to the initial transmittance by smoothing such that an output image restored by the transmittance correction unit is provided to be a dehazed clear image without a halo effect; calculating a final transmittance to be used to dehaze by using the restored image calculation unit; and outputting a dehazed restored image processed by image restoration and postprocessing by using the postprocessing unit.

According to the present invention as set forth, it is possible to provide a clear image by removing components that lower visibility, from an image having lowered visibility due to mixture of light and color components of an object and light and color components, such as haze, fog, clouds, and the like, in the air.

Further, according to the present invention, it is possible to maintain dehazing performance without a halo effect, and an amount of calculation is reduced to enable real-time processing in an embedded processor, such as a mobile phone.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Specific features and advantages of the present invention will be more clearly understood from the following detailed description when taken in conjunction with the accompanying drawings. In case functions related to the present invention and specific description for the configuration unnecessarily obscure the gist of the present invention, it is noticed that the specific description will be omitted.

According to the present invention, an initial transmittance is obtained by an exponentiation operation with a lower bound of transmittance, and the initial transmittance is corrected to obtain a transmittance for a haze component, whereby haze removal is performed. In a conventional method, the initial transmittance is obtained through area processing, such as filtering, wherein in the process of refining a transmittance, a large amount of calculating is required to reduce a halo effect. On the contrary, in the present invention, the initial transmittance is obtained through processing each pixel, and a small amount of calculating is required in the process of transmittance correction.

Further, the present invention is configured such that when RGB color signals are input, operation is mainly performed with information on the transmittance but not performed with each color channel, whereby it is possible to reduce the calculation amount. Further, it is possible to perform most operations, such as transmittance lower bound calculation and exponentiation operation, at the same time using LUT (lookup table).

In terms of transmittance correction requiring the largest amount of calculating, a moving average filter that requires a small amount of calculating is applied to improve performance. The present invention is advantageous in that an amount of calculating is reduced to enable real-time processing in an embedded processor, such as a mobile phone, and it is possible to realize excellent dehazing performance. The present invention is further advantageous in that since the present invention has excellent dehazing performance with brightness signals, it is possible to apply various color formats (YCb, Cr, YUV, and so on) used in multimedia systems.

Hereinbelow, the present invention will be described in detail with reference to the accompanying drawings.

Figure 3:
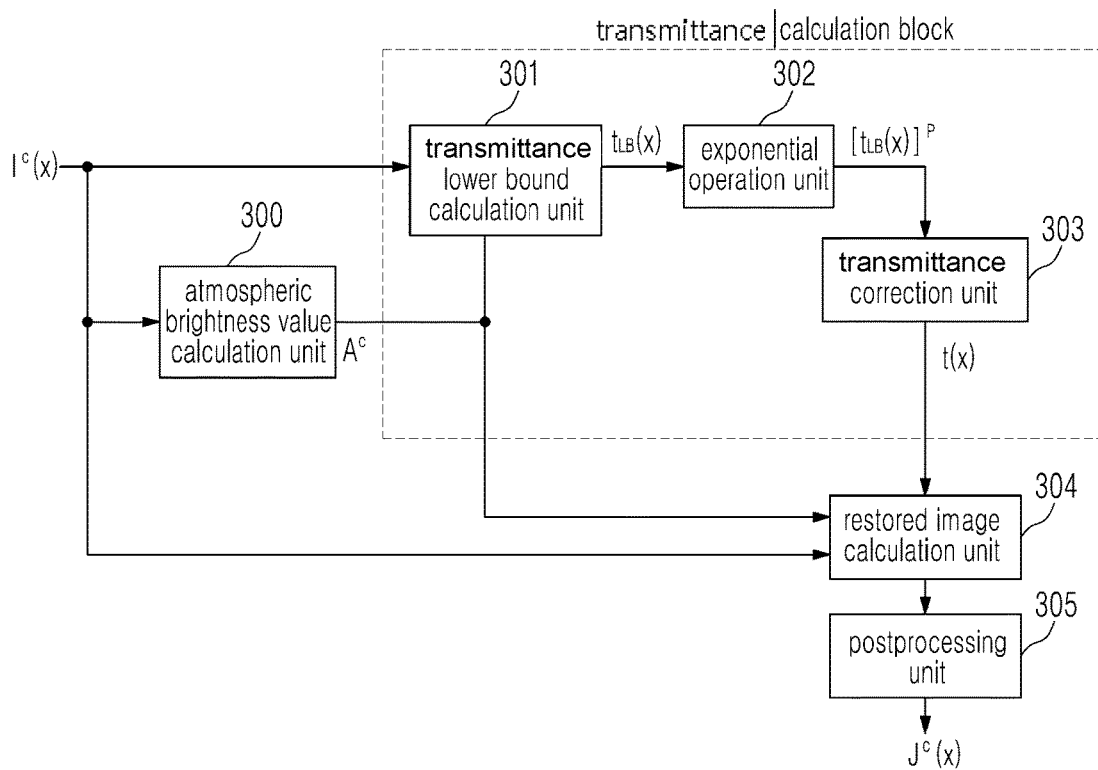
FIG. 3 illustrates an overall block diagram of the system for image dehazing by modifying a lower bound of a transmittance and a method therefor.

First, FIG. 3 illustrates a diagram of an image dehazing system modifying a lower bound of a transmittance according to an embodiment of the present invention. As shown in FIG. 3, the image dehazing system by modifying a lower bound of a transmittance may include: an atmospheric brightness value calculation unit 300; a transmittance lower bound calculation unit 301; an exponentiation operation unit 302; a transmittance correction unit 303; a restored image calculation unit 304; and a postprocessing unit 305.

The atmospheric brightness value calculation unit 300 is provided for calculating an atmospheric brightness value $A^c$ corresponding to a distance farthest away from a camera relative to an input signal $I^c(x)$.

The atmospheric brightness value calculation process is a process of obtaining the atmospheric brightness value $A^c$ corresponding to a distance farthest away from the camera. The atmospheric brightness value is obtained as follows. As shown in Equation 10, a minimum value of RGB color channel for each pixel is calculated, and the atmospheric brightness value $A^c$ is obtained by making a mean value of RGB values of pixels, which have the minimum value obtained by Equation 10 larger than a predetermined threshold value, of pixels on a current image.

$$\min I(x) = \min_{c \in \{R,G,B\}} (I^c(x)) \qquad \text{[Equation 10]}$$

The transmittance lower bound calculation unit 301 is provided for calculating a lower bound of transmittance $t_{LB}(x)$, and performs Equation 11 by receiving the hazy input signal $I^c(x)$ and the atmospheric brightness value $A^c$ output from the atmospheric brightness value calculation unit. Herein, the transmittance lower bound calculation is capable of calculating the lower bound of transmittance $t_{LB}(x)$ through operation of Equation 11.

$$t_{LB}(x) = 1 - \min_{c \in \{R,G,B\}} \left( \frac{I^c(x)}{A^c} \right) \qquad \text{[Equation 11]}$$

In [Equation 11], the hazy input signal $I^c(x)$ and the atmospheric brightness value $A^c$ output from the atmospheric brightness value calculation unit are input; $\min_{c \in \{R, G, B\}}(I^c(x))$ is an operation for obtaining the minimum value of RGB color channel in an x coordinate; and $A^c$ is an output from the atmospheric brightness value calculation unit.

The exponentiation operation unit 302 is provided for operating an initial transmittance $[t_{LB}(x)]^P$ by multiplying the lower bound of transmittance P times. In the process of the exponentiation operation, $[t_{LB}(x)]^P$ is output by multiplying the lower bound of transmittance P times, wherein $[t_{LB}(x)]^P$ corresponds to the initial transmittance. The initial transmittance, as an output through the exponentiation operation, includes information on haze components included in an input image and reflection components unique to an object, whereby in the case of dehazing using the initial transmittance, a dehazing effect may be reduced since transmittance for the reflection components is included.

The transmittance correction unit 303 is provided for calculating a final transmittance by correcting the initial transmittance such that an output restored image is dehazed without a halo effect. In the transmittance correction process is a process of extracting a transmittance for haze components from the initial transmittance. The haze components have a constant value locally. On the contrary, the reflection components vary according to changes in brightness (colors) included in the image. Accordingly, the transmittance for the haze components included in the initial transmittance corresponds to low-frequency components, and the transmittance for the reflection components corresponds to high-frequency components.

Thus, the transmittance for the haze components is obtained by low-pass filter processing. However, when the transmittance obtained by low-pass filter processing is directly applied to dehazing, dehazing performance is good but a halo effect occurs near an edge where changes in brightness are large. Accordingly, in the transmittance correction process, by smoothing the initial transmittance while having a strong edge relative to the initial transmittance, the final transmittance $t(x)$ is calculated.

The restored image calculation unit 304 is provided for calculating a dehazed image through operation. The restored image calculation unit 304 is configured such that the dehazed image is calculated by Equation 12.

The dehazed image may be output by performing Equation 12 with the input image $I^c(x)$ and the final transmittance $t(x)$.

$$J^c(x) = \frac{I^c(x) - A^c}{\max(t(x), t_0)} + A^c \qquad \text{[Equation 12]}$$

In Equation 12, $J^c(x)$ refers to a brightness value of output color channel c in the x coordinate; $I^c(x)$ refers to a brightness value of input color channel c in the x coordinate; $A^c$ refers to an output from the atmospheric brightness value calculation unit; $t(x)$ refers to the transmittance (as a value expressing a degree of haziness, 0 referring to opacity, and 1 referring to transparency) in the x coordinate; and to refers to a minimum transmittance for preventing noise amplification caused when the transmittance is very small.

The postprocessing unit 305 is provided for outputting a final restored image $J^c(x)$ by increasing brightness contrast.

The image dehazing system according to the present invention may be configured such that the final transmittance is obtained by applying an edge reserved low-pass filter to the initial transmittance.

The image dehazing system may further include: an initial transmittance separation unit arranged to separate the initial transmittance into low-frequency components $t_L(x)$ and high-frequency components $t_H(x)$; and a compression coefficient computing unit arranged such that the high-frequency components are low-pass filtered to obtain a compression coefficient value $\omega(x)$ proportional to an absolute value of the initial transmittance having been low-pass filtered as shown in Equation 13, and the final transmittance $t(x)$ is obtained by adding a value $t_h(x)$ obtained by multiplying the compression coefficient value by the high-frequency components and the low-frequency components of the initial transmittance.

$$t_h(x) = w(x) \times t_H(x) \qquad \text{[Equation 13]}$$
$$= \min\left(\frac{|F(t_H(x))|}{D}, 1\right) \times t_H(x)$$

The image dehazing system may further include: an initial transmittance separation unit arranged to separate the initial transmittance into low-frequency components $t_L(x)$ and high-frequency components $t_H(x)$; a threshold value processing unit for expressing a position of a component of the high-frequency components $t_H(x)$ of the initial transmittance greater than a threshold value as 1; an independent component removal unit for converting independently existing 1 output from the threshold value processing unit into 0; an extension processing unit configured to perform an extension processing on a component expressed as 1 output from the independent component removal unit so as to output a value $R(x)$ having a position of an extended area expressed as 1 and a position of a rest expressed as 0; a multiplication operator for obtaining modified high-frequency components $t_h(x)$ by multiplying the value $R(x)$ by the high-frequency components of the initial transmittance; and an addition operator for outputting the final transmittance t(x) by adding the modified high-frequency components $t_h(x)$ of the initial transmittance and the low-frequency components $t_L(x)$.

Meanwhile, a method for image dehazing by modifying a lower bound of transmittance, wherein the method uses a system for image dehazing by modifying a lower bound of transmittance, the image dehazing system including: an atmospheric brightness value calculation unit, a transmittance lower bound calculation unit, an exponentiation operation unit, a transmittance correction unit, a restored image calculation unit, and a postprocessing unit, the method may include: calculating a brightness value relative to an atmospheric brightness value of an input image by using the atmospheric brightness value calculation unit; calculating a lower bound of transmittance for each pixel using information on the input image and the atmospheric brightness value by using the transmittance lower bound calculation unit; obtaining an initial transmittance by an exponentiation operation with the lower bound of transmittance by using the exponentiation operation unit; correcting the input image to have a strong edge relative to the initial transmittance by smoothing such that an output image restored by the transmittance correction unit is provided to be a dehazed clear image without a halo effect; calculating a final transmittance to be used to dehaze by using the restored image calculation unit; and outputting a dehazed restored image processed by image restoration and postprocessing by using the postprocessing unit.

Hereinbelow, reference will be made in greater detail to the present invention.

In methods for dehazing using one image, the following modeling equation is commonly used.

$$I(x)=J(x)t(x)+A(1-t(x)) \quad \text{[Equation 1]}$$

Herein, I(x) is a value of the xth pixel of the hazy image obtained by a camera; J(x) is a dehazed clear image; and A is the atmospheric brightness value of a pixel in the image, which is the farthest away from the camera. t(x) is the transmittance, and in general, the transmittance t(x) decreases exponentially according to a distance, as the following Equation 2.

$$t(x)=e^{-\beta d(x)} \quad \text{[Equation 2]}$$

Herein, $\beta$ is scattering coefficient of air, and d(x) is a distance between the camera and a point in a space corresponding to the xth pixel. A value of the scattering coefficient $\beta$ is related to s particle size in the air, wherein $\beta$ approaches 1 for big particles, such as rain drops and heavy haze particles, while it approaches 0 for small particles when the weather is clear. Accordingly, in the case where the scattering coefficient $\beta$ is constant, the transmittance for a distant location, such as the sky, approaches 0, and accordingly, $I(X) \cong A$ in [Equation 1], and $I(x) \cong J(x)$ since a pixel in very close location has transmittance approaching 1. Accordingly, a bright pixel in the image can be assumed as a case of a far location and heavy haze, and the transmittance t(x) has a small value.

In order to remove haze, A and t(x) are obtained from the input image I(x) obtained by the camera, and the final dehazed image J(x) is restored by using A and t(x). The transmittance can be obtained from Equation 1 and restoration value can be obtained from Equation 3 and Equation 4.

$$t(x) = \frac{I(x) - A}{J(x) - A} \quad \text{[Equation 3]}$$

$$J(x) = \frac{I(x) - A}{t(x)} + A \quad \text{[Equation 4]}$$

Meanwhile, the dehazed image J(x) must satisfy $0 \leq J(x) \leq I(x)$. Thus, a range of the transmittance t(x) is determined as Equation 5.

In Equation 5, the lower bound of transmittance $t_{LB}(x)=1-I(x)/A$ means transmittance in the case where an object is invisible due to the heavy haze or the object has no radiance.

$$1 - \frac{I(x)}{A} \leq t(x) \leq 1 \quad \text{[Equation 5]}$$

In the case where the same scene (the same distance between the camera and a point in a space) is taken under two different weather conditions (with different $\beta$ values), the images of the scene taken by the camera can be described in Equation 6, respectively.

$$I_1(x)=J(x)t_1(x)-A_1(1-t_1(x))$$

$$I_2(x)=J(x)t_2(x)-A_2(1-t_2(x)) \quad \text{[Equation 6]}$$

Further, the interrelation between transmittance s under two situations is described in the following Equation 7 and Equation 8.

$$\frac{lnt_1(x)}{lnt_2(x)} = \frac{\beta_1}{\beta_2} = P \text{ (Constant)} \quad \text{[Equation 7]}$$

$$t_1(x) = [t_2(x)]^P \quad \text{[Equation 8]}$$

Consequently, if the scattering coefficient rate under two situations and the transmittance under one situation are known, the transmittance under the other weather condition can be calculated. If the atmospheric brightness value is the same (i.e. A1=A2=A) and the transmittance under one weather condition is the same as the lower bound of transmittance $t_{LB}(x)$, the transmittance under a specific weather condition can be obtained from Equation 8, as Equation 9.

$$t(x) = \left[1 - \frac{I(x)}{A}\right]^P = [t_{LB}(x)]^P, 0 \leq P < 1 \quad \text{[Equation 9]}$$

Herein, the scattering coefficient rate constant P is smaller than 1 because a scattering coefficient in the lower bound of transmittance situation is bigger than that in other weather conditions.

Figure 1:
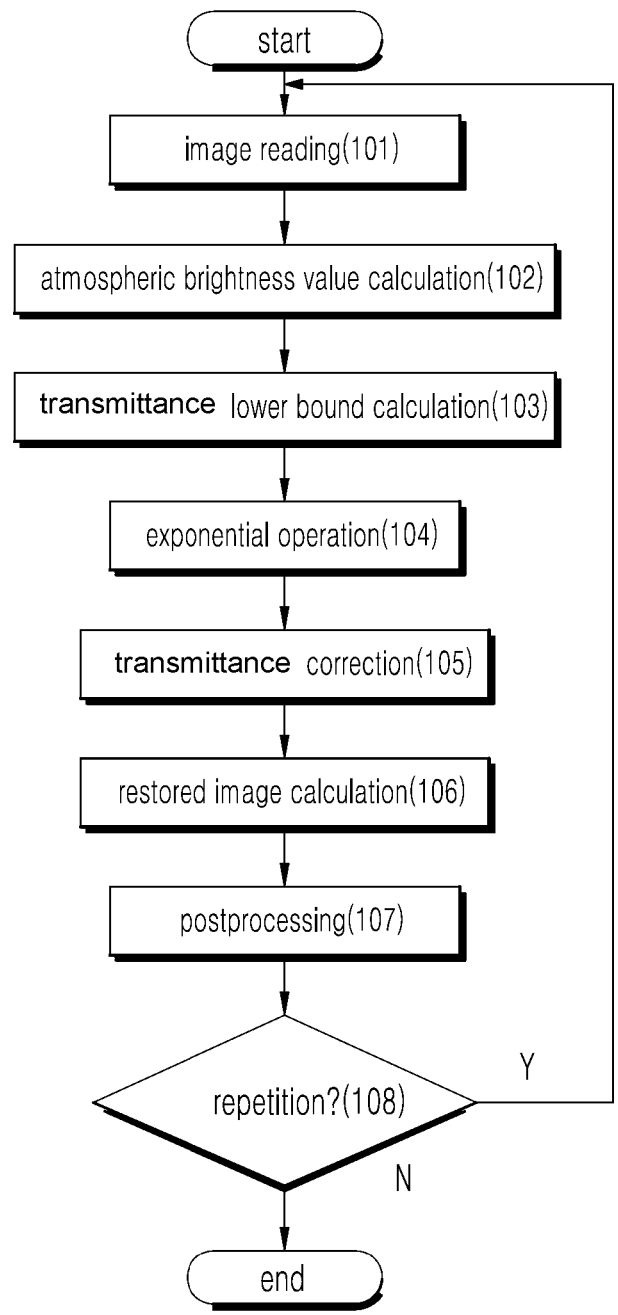
FIG. 1 illustrates an overall diagram of an image dehazing system modifying a lower bound of a transmittance according to the present invention.

FIG. 1 illustrates a flowchart of a method for image dehazing according to the present invention. In a step of image reading 101, a frame of an image taken by the camera is stored. If RGB color signals are input, both the input signal $I^c(x)$ and the output signal $J^c(x)$ are RGB color signals (i.e. $c \in \{R, G, B\}$); if brightness signals are input, both the input signal $I^c(x)$ and the output signal $J^c(x)$ are brightness signals.

A step of atmospheric brightness value calculation 102 is a process of obtaining the atmospheric brightness value corresponding to a distance farthest away from the camera. The atmospheric brightness value is obtained as follows. As shown in Equation 10, a minimum value of RGB color channel for each pixel is calculated, and the atmospheric brightness value $A^c$ is obtained by making a mean value of RGB values of pixels, which have the minimum value obtained by Equation 10 larger than a predetermined threshold value, of pixels on a current image. FIG. 2(G) illustrates an example where positions of pixels that have a minimum value obtained from the hazy input image by Equation 10 brighter than the top 1% of atmospheric brightness are shown as red.

$$\min I(x) = \min_{c \in \{R,G,B\}} (I^c(x)) \quad \text{[Equation 10]}$$

A step of transmittance lower bound calculation 103 performs Equation 11 by receiving the hazy input signal $I^c(x)$ and the atmospheric brightness value $A^c$ output from the atmospheric brightness value calculation 102.

Figure 2A:
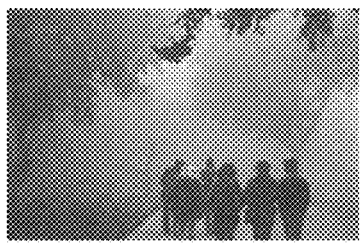
FIGS. 2A through 2J illustrate a result of simulation according to the image dehazing system of FIG. 1.
Figure 2B:

FIG. 2(B) illustrates an example of the lower bound of transmittance obtained by Equation 11, wherein a heavily hazy area far away from the camera has a small value and a light hazy area close to the camera has a large value.

$$t_{LB}(x) = 1 - \min_{c \in \{R,G,B\}} \left( \frac{I^c(x)}{A^c} \right) \quad \text{[Equation 11]}$$

A step of exponentiation operation 104 outputs $[t_{LB}(x)]^P$ by multiplying the lower bound of transmittance P times by Equation 9, wherein $[t_{LB}(x)]^P$ corresponds to the initial transmittance.

Figure 2C:
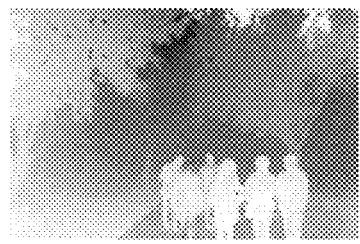

FIG. 2(C) illustrates an example of a result by multiplying the lower bound of transmittance 0.75 times, wherein the transmittance as a result of the above operation has a value larger than the lower bound of transmittance for FIG. 2(B).

The initial transmittance, as an output from the step of exponentiation operation 104, includes information on haze components included in an input image and reflection components unique to an object, whereby in the case of dehazing using the initial transmittance, dehazing effect may be reduced since transmittance for the reflection components is included.

A step of transmittance correction 105 is a process of extracting transmittance for haze components from the initial transmittance. The haze components have a constant value locally; on the contrary, the reflection components vary according to changes in brightness (colors) included in the image. Accordingly, the transmittance for the haze components included in the initial transmittance corresponds to low-frequency components, and the transmittance for the reflection components corresponds to high-frequency components.

Thus, the transmittance for the haze components can be obtained by low-pass filter processing. However, when the transmittance obtained by low-pass filter processing is directly applied to dehazing, dehazing performance is good but a halo effect occurs near an edge where changes in brightness are large. Accordingly, in the transmittance correction process, by smoothing the initial transmittance while having a strong edge relative to the initial transmittance, the final transmittance t(x) is calculated.

Figure 2D:
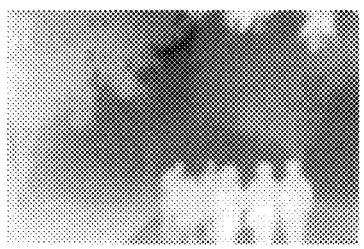
Figure 2E:
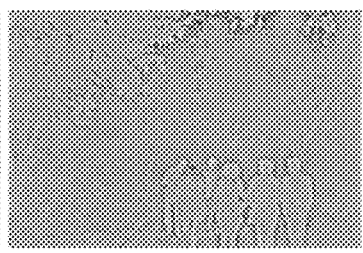
Figure 2F:
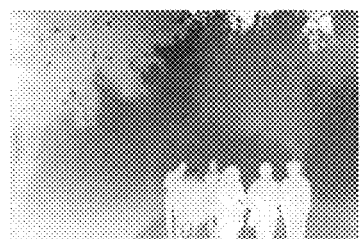
Figure 2G:

FIG. 2(D) illustrates an example of the low-frequency components of the initial transmittance; FIG. 2(E) illustrates an example of the high-frequency components of the initial transmittance; and FIG. 2(F) illustrates an example of the final transmittance as a result of the transmittance correction 105. As a result of the transmittance correction from these examples, the heavily hazy part is similar to the low-frequency components of the initial transmittance for FIG. 2(D), and the light hazy part having a sharp edge (an area of a person, and an area of a nearby leaf) is similar to the initial transmittance for FIG. 2(C).

A step of restored image calculation 106 outputs the dehazed image by performing Equation 12 with the input image $I^c(x)$ and the final transmittance t(x), and outputs a final restored image by improving brightness contrast of the dehazed image in the postprocessing 107.

$$J^c(x) = \frac{I^c(x) - A^c}{\max(t(x), t_0)} + A^c \quad \text{[Equation 12]}$$

Figure 2H:
Figure 2I:
Figure 2J:

Herein, $t_0$ refers to a minimum transmittance for preventing noise amplification caused when the transmittance is very small. FIGS. 2(H) to 2(J) illustrate the output images restored by Equation 12. FIG. 2(H) illustrates a restored image, to which the initial transmittance obtained by Equation 9 is applied; FIG. 2(I) illustrates a restored image, to which the initial transmittance low-frequency components are applied; and FIG. 2(J) illustrates a restored image, to which a result of the transmittance correction is applied. The restored image of FIG. 2(H), to which the initial transmittance for FIG. 2(C) is applied, has no halo effect, but it has a low dehazing effect. The restored image of FIG. 2(I), to which the low-frequency components of the initial transmittance for FIG. 2(D) are applied, shows a good dehazing performance, but a halo effect occurs at a location close to the camera. The restored image of FIG. 2(G), to which the final transmittance as a result of correction of FIG. 2(F) is applied, shows a good dehazing performance without a halo effect.

In the case of a video clip, by determining whether there is an image to be processed, repetition is required, steps from image reading 101 to repetition 107 are repeated, or repetition is not required, the process is ended.

FIG. 3 illustrates an overall block diagram of the system for image dehazing by modifying a lower bound of a transmittance and a method therefor of FIG. 1. Hereinafter, the operational process will be described. The atmospheric brightness value $A^c$ corresponding to a distance farthest away from a camera relative to an input signal $I^c(x)$ is calculated in the atmospheric brightness value calculation unit 300.

The lower bound of transmittance $t_{LB}(x)$ is calculated in the transmittance lower bound calculation unit 301 by Equation 11. The value $[t_{LB}(x)]^P$ obtained by multiplying the lower bound of transmittance P times is output from the exponentiation operation unit 302, wherein the value $[t_{LB}(x)]^P$ is the initial transmittance.

The transmittance correction unit 303 calculates the final transmittance by correcting the initial transmittance such that an output restored image is dehazed without a halo effect; the restored image calculation unit 304 calculates a dehazed image through operation of Equation 12; and the postprocessing unit 305 outputs the final restored image $J^c(x)$ by increasing brightness contrast.

Figure 4:
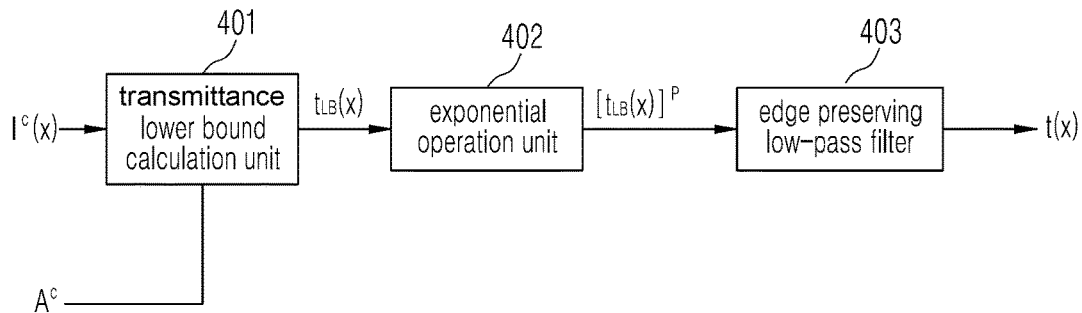
FIG. 4 illustrates an exemplary block diagram of transmittance calculation method 1.

FIG. 4 illustrates an exemplary block diagram of transmittance calculation method 1 of the transmittance calculation block of FIG. 3; and FIG. 5 illustrates a dehazing process according to the transmittance calculation method 1 of FIG. 4.

As a method for transmittance correction to the initial transmittance $[t_{LB}(x)]^P$ output from an exponentiation operation unit 402, the final transmittance is obtained by applying an edge reserved low-pass filter 403 to the initial transmittance. An example of the edge reserved low-pass filter is a bilateral low-pass filter, wherein the edge reserved low-pass filter is configured such that weak low-pass filtering is performed at an edge and strong low-pass filtering is performed at a smooth area, thereby extracting low-frequency components while serving edge.

Figure 5A:
FIGS. 5A through 5D illustrate images dehazed by the transmittance calculation method 1 of FIG. 4.
Figure 5B:
Figure 5C:
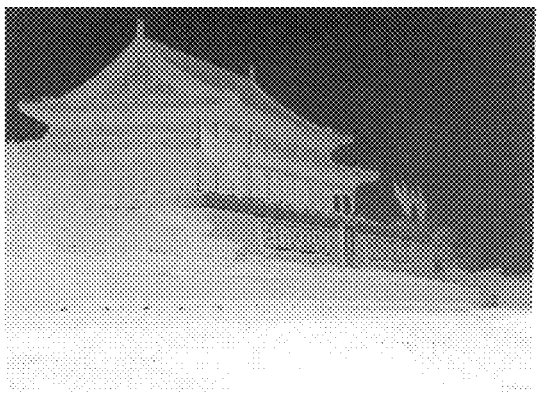
Figure 5D:
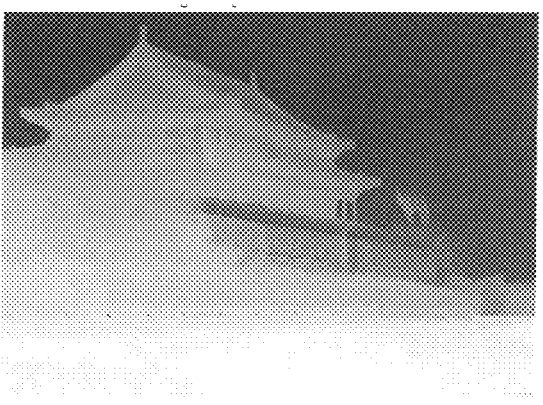

FIG. 5(A) illustrates an input image; and FIG. 5(B) illustrates a dehazed output image, which shows a good dehazing performance without a halo effect. FIG. 5(C) illustrates the initial transmittance output from the exponentiation operation unit 402; and FIG. 5(D) illustrates the final transmittance, to which 15×15 bilateral Gaussian low-pass filter, as the edge reserved low-pass filter 403, is applied, wherein compared with the initial transmittance for FIG. 5(C), a part having a strong edge (an edge in light haze) has the initial transmittance similar to that of FIG. 5(C), and on the contrary, strong low-pass filtering is performed at a part having weak edge.

Figure 6:
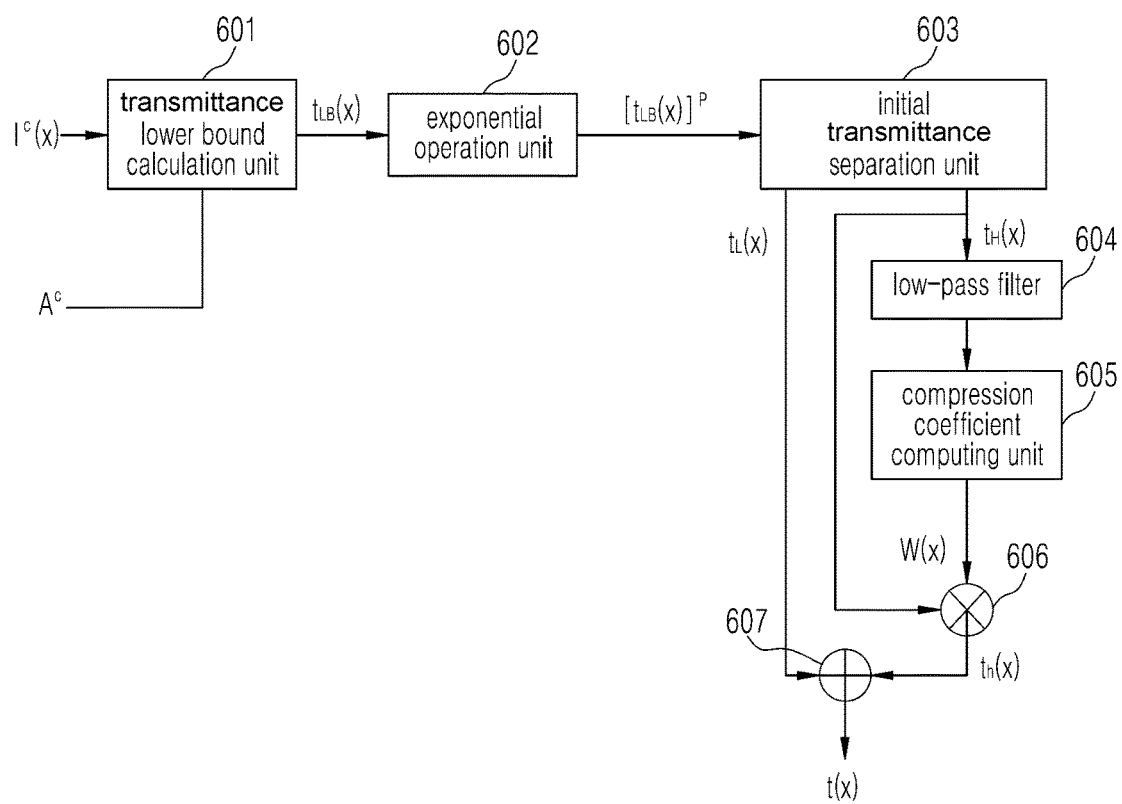
FIG. 6 illustrates an exemplary block diagram of transmittance calculation method 2.

FIG. 6 illustrates an exemplary block diagram of transmittance calculation method 2; and FIG. 7 illustrates images dehazed by the transmittance calculation method 2 of FIG. 6.

The transmittance calculation method 2 is configured such that in order to correct the initial transmittance $[t_{LB}(x)]^P$ output from an exponentiation operation unit 402, the initial transmittance is separated into low-frequency components $t_L(x)$ and high-frequency components $t_H(x)$ in an initial transmittance separation unit 603.

Figure 7A:
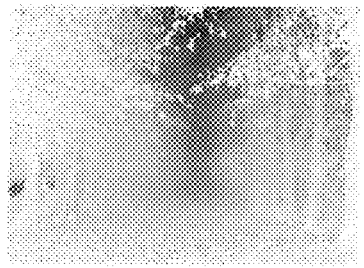
FIGS. 7A through 7H illustrate images dehazed by the transmittance calculation method 2 of FIG. 6.
Figure 7B:
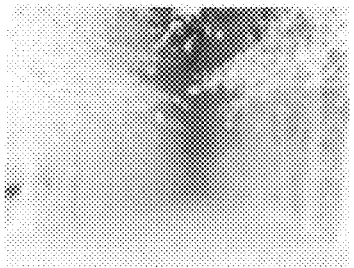
Figure 7C:
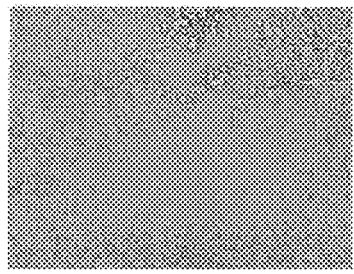

FIG. 7(A) illustrates the initial transmittance; and FIGS. 7(B) and 7(C) respectively illustrate the low-frequency components $t_L(x)$ and the high-frequency components $t_H(x)$ of the initial transmittance separated by using a 15×15 average filter. The high-frequency components shown in FIG. 7(C) has a large value in the leaf in the light haze (close to the camera), and has a small value in a heavily hazy area (far away from the camera).

Large high-frequency components occurring in the strong edge should be compensated by the low-frequency components to prevent a halo effect; and small high-frequency components should be removed to improve definition of the restored image. The present invention is configured such that a weighting close to 1 is given to a large value of the high-frequency components, and a weighting close to 0 is given to a small value of the high-frequency components.

To reduce noise component from the high-frequency components $t_H(x)$, the low-pass filter 604 is applied. As shown in Equation 13, a compression coefficient computing unit 605 calculates a compression coefficient value $\omega(x)$ proportional to an absolute value of the high-frequency components $t_H(x)$ in consideration of the high-frequency components $t_H(x)$ that have a large value in the area having a strong edge and have a small value in the smooth area, wherein the compression coefficient value $\omega(x)$ has a value close to 1 relative to the initial transmittance corresponding to the strong edge, and has a value close to 0 relative to the smooth area.

The final transmittance t(x) is obtained by adding a value $t_h(x)$ obtained by multiplying the compression coefficient value $\omega(x)$ by the high-frequency components $t_H(x)$ and the low-frequency components $t_L(x)$ of the initial transmittance.

$$t_h(x) = w(x) \times t_H(x) \qquad \text{[Equation 13]}$$
$$= \min\left(\frac{|F(t_H(x))|}{D}, 1\right) \times t_H(x)$$

Figure 7D:
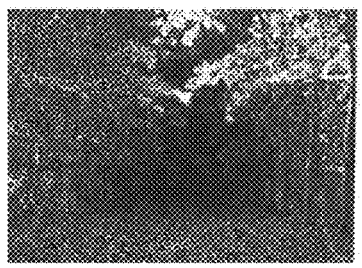
Figure 7E:
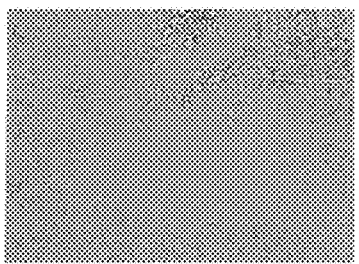
Figure 7F:
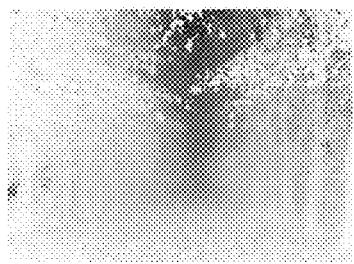
Figure 7G:
Figure 7H:

Herein, F(•) is an operator for low-pass filtering. FIG. 7(D) illustrates an example of the compression coefficient $\omega(x)$ having a value close to 1 in the leaf in the light haze (close to the camera), and having a value close to 0 in a heavily hazy area. FIG. 7(E) illustrates an example of the compressed high-frequency components $t_h(x)$; and FIG. 7(F) illustrates the final transmittance. FIGS. 7(G) and 7(H) illustrate an input image and a dehazed restored image.

Figure 8:
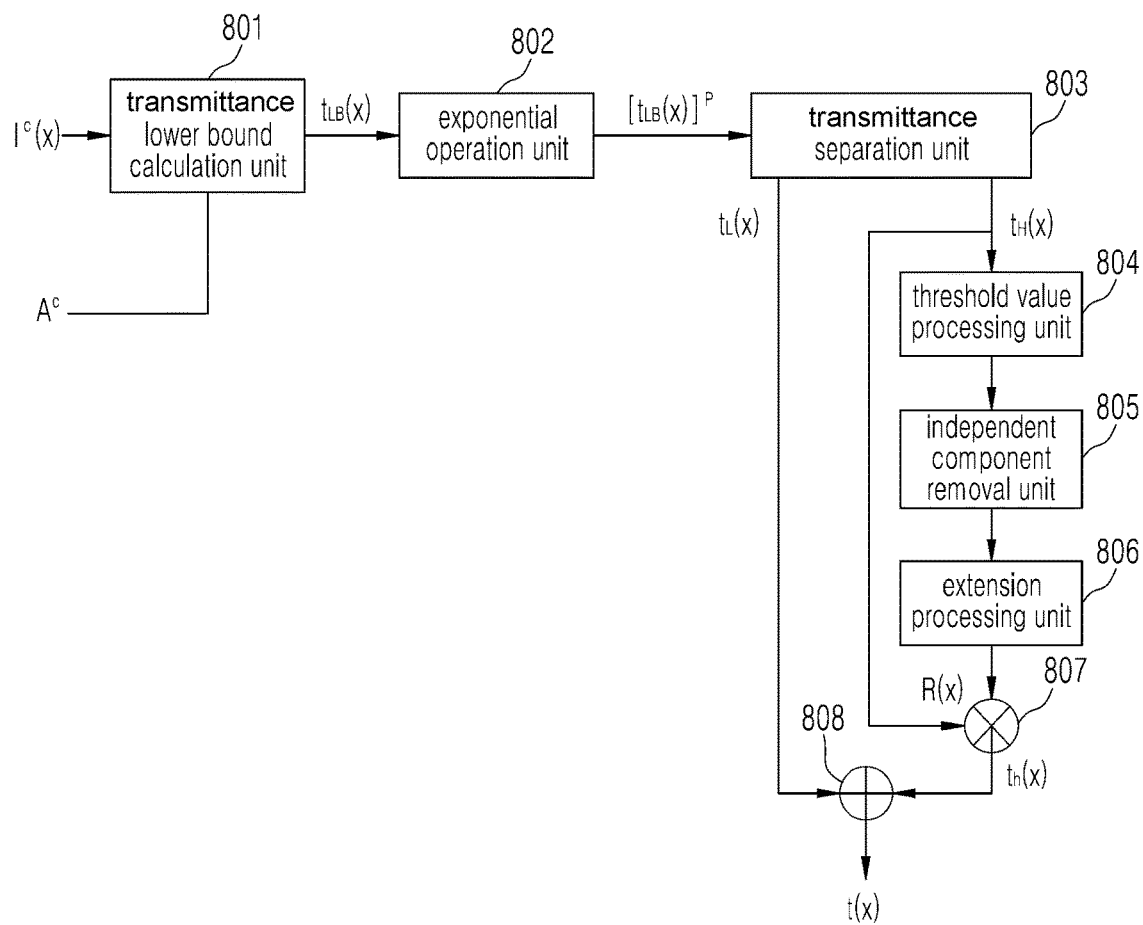
FIG. 8 illustrates an exemplary block diagram of transmittance calculation method 3.

FIG. 8 illustrates an exemplary block diagram of transmittance calculation method 3; and FIG. 9 illustrates images dehazed by the transmittance calculation method 3 of FIG. 8.

The initial transmittance $[t_{LB}(x)]^P$ output from an exponentiation operation unit 802 is separated into low-frequency components $t_L(x)$ and high-frequency components $t_H(x)$ in an initial transmittance separation unit 803.

A threshold value processing unit 804 expresses a position of a component of the high-frequency components $t_H(x)$ of the initial transmittance greater than a threshold value as 1.

An independent component removal unit 805 removes positional components showing a large edge caused by noise in the output process from the threshold value processing unit 804.

An extension processing unit 806 performs an extension processing on a component expressed as 1 output from the independent component removal unit so as to output a value R(x) having a position of an extended area expressed as 1 and a position of a rest expressed as 0.

Accordingly, a value $t_h(x)$ output from a multiplication operator 807 is as follows: a value R(x) having 1 output from the extension processing unit is the same position as the initial transmittance $t_H(x)$, and a position of a rest has 0.

An addition operator 808 outputs the final transmittance t(x) by adding the modified high-frequency components $t_h(x)$ of the initial transmittance and the low-frequency components $t_L(x)$.

Figure 9A:
FIGS. 9A through 9H illustrates image dehazed by the transmittance calculation method 3 of FIG. 8.
Figure 9B:
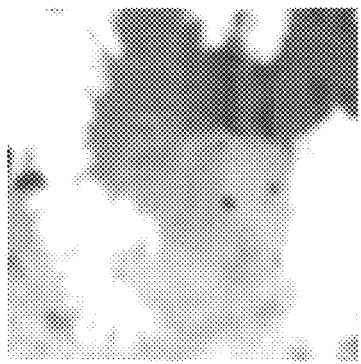
Figure 9C:
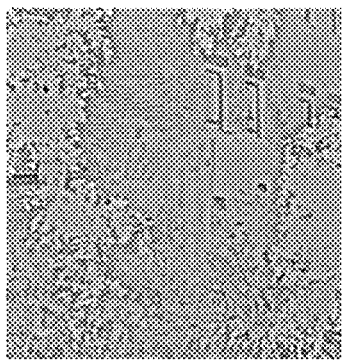
Figure 9D:
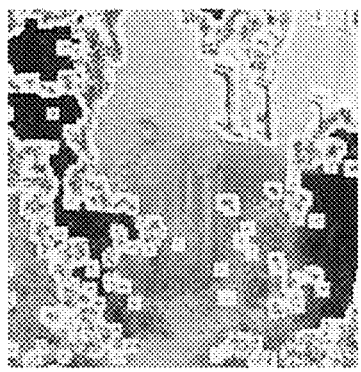
Figure 9E:
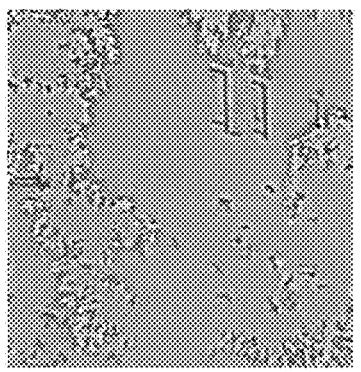
Figure 9F:
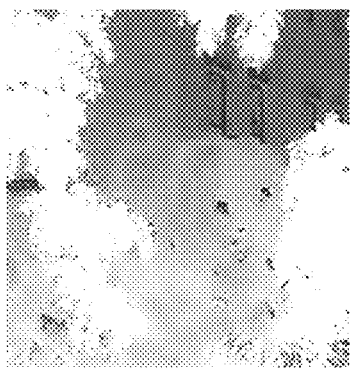
Figure 9G:
Figure 9H:

FIG. 9(A) illustrates the initial transmittance; and FIGS. 9(B) and 9(C) illustrate the low-frequency components $t_L(x)$ and the high-frequency components $t_H(x)$ of the initial transmittance. FIG. 9(D) illustrates a process of calculating a value R(x) in the extension processing unit 806, wherein a red color shows a position of a component having a value larger than a threshold value by the threshold value processing unit 804, and a yellow color shows an extension area by extension processing unit. A position of the red not included in the yellow part shows positional components removed by the independent component removal unit 805. FIG. 9(E) illustrates the modified high-frequency components $t_h(x)$; and FIG. 9(F) illustrates the final transmittance. FIGS. 9(G) and 9(H) illustrate an input image and a dehazed restored image.

The present invention provides a clear image by removing components that lower visibility, from an image having lowered visibility due to mixture of light and color components of an object and light and color components, such as haze, fog, clouds, and the like, in the air. In particular, the present invention requires a small amount of calculating, which enables real-time processing in an embedded processor, and has a good dehazing performance. Thus, in the case where the present invention is applied to a high resolution monitoring system, an image black box for automobile, fire prevention system, and the like, lowered visibility problems due to fog or smoke can be solved. Further, the present invention can be applied to advanced safety vehicles that are recently under study. Further, the present invention can be applied to various smartphone apps relating to images since it is possible to process high-definition image in mobile phones. Currently, color coordinate systems used in most multimedia systems use a brightness signal and a chrominance signal like YCbCr color coordinate system, rather than an RGB coordinate system. Thus, the present invention has an excellent performance with only brightness information, whereby it is easy to be adapted to multimedia system without conversion processing of a color coordinate system.

Description of reference characters used in the embodiment is as follows.

I(x): brightness value of input pixel in x coordinate

J(x): brightness value of dehazed output pixel in x coordinate t(x): transmittance in x coordinate (as a value expressing a degree of haziness, 0 referring to opacity, and 1 referring to transparency)

A: atmospheric brightness value of a pixel corresponding to a distance farthest away from camera $t_{LB}$(x): lower bound of transmittance for input pixel in x coordinate $t_L$(x): transmittance (low-frequency components) for haze components of transmittance in x coordinate $t_H$(x): transmittance (high-frequency components) for reflection components of transmittance in x coordinate sel_comp(•): selective compression operation $t_h$(x): transmittance (high-frequency components) for reflection components in x coordinate processed by selective compression c∈{R, G, B}: R, G, B color channel $I^c$(x): brightness value of input color channel c in x coordinate $J^c$(x): brightness value of output color channel c in x coordinate $Min_{c∈\{R, G, B\}}(I^c(x))$: operation for obtaining minimum value of RGB color channel in x coordinate $[a(x)]^P$: signal a in an x coordinate raised to Pth D: threshold value used for selective compression $t_0$: minimum transmittance Although the present invention has been described in conjunction with the preferred embodiments which illustrate the technical spirit of the present invention, it will be apparent to those skilled in the art that the present invention is not limited only to the illustrated and described configurations and operations themselves but variations and modifications are possible without departing from the scope of the spirit of the invention. Accordingly, all of appropriate variations, modifications and equivalents are considered to pertain to the scope of the present invention.

What is claimed is:

1. A system for image dehazing by modifying a lower bound of a transmittance, the system comprising:
   an atmospheric brightness value calculation unit for calculating an atmospheric brightness value ($A^c$) corresponding to a distance farthest away from a camera relative to an input signal [$I^c$(x)];
   a transmittance lower bound calculation unit for calculating a lower bound of a transmittance [$t_{LB}$(x)] by receiving the input signal and the atmospheric brightness value from the atmospheric brightness value calculation unit;
   an exponentiation operation unit for operating an initial transmittance {$[t_{LB}(x)]^P$} by multiplying the lower bound of transmittance P times;
   a transmittance correction unit for calculating a final transmittance by correcting the initial transmittance such that an output restored image is dehazed without a halo effect;
   a restored image calculation unit for calculating a dehazed image through operation; and
   a postprocessing unit for outputting a final restored image [$J^c$(x)] by increasing brightness contrast.

2. The image dehazing system of claim 1, wherein the transmittance lower bound calculation unit calculates the lower bound of transmittance [$t_{LB}$(x)] by Equation 11

$$t_{LB}(x) = 1 - \min_{c \in \{R,G,B\}} \left( \frac{I^c(x)}{A^c} \right). \qquad \text{[Equation 11]}$$

3. The image dehazing system of claim 1, wherein the restored image calculation unit calculates the dehazed image by Equation 12

$$J^c(x) = \frac{I^c(x) - A^c}{\max(t(x), t_0)} + A^c. \qquad \text{[Equation 12]}$$

4. The image dehazing system of claim 1, wherein the final transmittance is obtained by applying an edge reserved low-pass filter to the initial transmittance.

5. The image dehazing system of claim 1 further comprising:
   an initial transmittance separation unit arranged to separate the initial transmittance into low-frequency components [$t_L$(x)] and high-frequency components [$t_H$(x)]; and
   a compression coefficient computing unit arranged such that the high-frequency components are low-pass filtered to obtain a compression coefficient value [ω(x)] proportional to an absolute value of the initial transmittance having been low-pass filtered as shown in Equation 13, and the final transmittance [t(x)] is obtained by adding a value [$t_h$(x)] obtained by multiplying the compression coefficient value by the high-frequency components and the low-frequency components of the initial transmittance $$t_h(x) = w(x) \times t_H(x) \qquad \text{[Equation 13]}$$
$$= \min\left(\frac{|F(t_H(x))|}{D}, 1\right) \times t_H(x).$$

6. The image dehazing system of claim 1 further comprising:
   an initial transmittance separation unit arranged to separate the initial transmittance into low-frequency components [$t_L$(x)] and high-frequency components [$t_H$(x)];
   a threshold value processing unit for expressing a position of a component of the high-frequency components [$t_H$(x)] of the initial transmittance greater than a threshold value as 1;
   an independent component removal unit for converting independently existing 1 output from the threshold value processing unit into 0;
   an extension processing unit configured to perform an extension processing on a component expressed as 1 output from the independent component removal unit so as to output a value [R(x)] having a position of an extended area expressed as 1 and a position of a rest expressed as 0;
   a multiplication operator for obtaining modified high-frequency components [$t_h$(x)] by multiplying the value [R(x)] by the high-frequency components of the initial transmittance; and an addition operator for outputting the final transmittance [t(x)] by adding the modified high-frequency components [$t_h(x)$] of the initial transmittance and the low-frequency components [$t_L(x)$].

7. A method for image dehazing by modifying a lower bound of a transmittance, wherein the method uses a system for image dehazing by modifying a lower bound of a transmittance, the image dehazing system including: an atmospheric brightness value calculation unit, a transmittance lower bound calculation unit, an exponentiation operation unit, a transmittance correction unit, a restored image calculation unit, and a postprocessing unit, the method comprising:

calculating a brightness value relative to an atmospheric brightness value of an input image by using the atmospheric brightness value calculation unit;

calculating a lower bound of a transmittance for each pixel using information on the input image and the atmospheric brightness value by using the transmittance lower bound calculation unit;

obtaining an initial transmittance by an exponentiation operation with the lower bound of transmittance by using the exponentiation operation unit;

correcting the input image to have a strong edge relative to the initial transmittance by smoothing such that an output image restored by the transmittance correction unit is provided to be a dehazed clear image without halo effect;

calculating a final transmittance to be used to dehaze by using the restored image calculation unit; and outputting a dehazed restored image processed by image restoration and postprocessing by using the postprocessing unit.

* * * * *